United States Patent [19]

Schenkel et al.

[11] Patent Number: 4,525,834

[45] Date of Patent: Jun. 25, 1985

[54] SERVICE INTEGRATED DIGITAL TRANSMISSION SYSTEM

[75] Inventors: Klaus D. Schenkel, Oppenweiler; Manfred Welzenbach, Backnang, both of Fed. Rep. of Germany

[73] Assignee: LICENTIA Patent-Verwaltungs-GmbH, Frankfurt am Main, Fed. Rep. of Germany

[21] Appl. No.: 327,083

[22] Filed: Dec. 3, 1981

[30] Foreign Application Priority Data

Dec. 5, 1980 [DE] Fed. Rep. of Germany ....... 3045876

[51] Int. Cl.³ .............................................. H04B 9/00
[52] U.S. Cl. ....................................... 370/3; 455/607; 455/612
[58] Field of Search ................ 455/2, 5, 606, 607, 455/608, 610, 612, 617, 618; 370/1, 3, 71, 73; 371/66; 358/84, 85; 364/200 MS File, 900 MS File; 375/58

[56] References Cited

U.S. PATENT DOCUMENTS

| 3,453,601 | 7/1969 | Boggrt et al. | 364/200 |
| 3,651,471 | 3/1972 | Haselwood et al. | 455/2 |
| 3,941,989 | 3/1976 | McLaughlin et al. | 364/900 |
| 4,061,577 | 12/1977 | Bell | 370/3 |

OTHER PUBLICATIONS

Cotten et al.-Fiber Optic Digital Video Systems for Commercial Cable TV Trunking Applications-SPIE, vol. 139, Guided Wave Optical Systems and Devices (1978) pp. 53–62.
Welzenbach et al.-The Application of Optical Systems for Cable TV-NTG Fachber, vol. 13, (1980) pp. 46–50.
Miki et al.-Two Way WDM Transmission-Euro. Conf. on Optical Comm. 4th (Genoa, Italy) pp. 646–653).
Hinoshita-Optical Fiber Two Way WDM Video Transmission System-Conf. 3rd World Telecomm. Forum (Geneva, Switz) 19–26, Sep. 1979, pp. 3.2.4/1–3.
Bosik-The Case in Favor of Burst Mode-NTG Fachbericht, vol. 73, p. 26.
The International Symposium on Subscriber Loops and Services, Mar. 1978, pp. 39–43, "Optical Fibre Transmission Developments and the Local Loop".
IEEE Transactions on Communications, vol. COM-27, No. 2, Feb. 1979, "Optical Switching System Experiment".

Primary Examiner—Joseph A. Orsino, Jr.
Attorney, Agent, or Firm—Spencer & Frank

[57] ABSTRACT

In a service integrated multiplex signal transmission system for transmitting narrowband and broadband signals between a central exchange terminal and a subscriber terminal, which system includes a light conductor path connected between the terminals, a transmitter device at one terminal composed of sources of such narrowband and broadband signals and multiplexers connected for combining the signals provided by the sources into a multiplex signal and for supplying such multiplex signal to the light conductor path, and a receiver device at the other terminal composed of demultiplexers connected to the light conducting path for receiving multiplex signals from that path and separating the received multiplex signals into narrowband signals and broadband signals, the device at the subscriber terminal being normally supplied with operating power by local utility mains, and including a charge accumulator for supplying operating power independently of the local mains, connected for supplying such power to the device at the subscriber terminal in the event of interruption of the power supply provided by the local mains, and the system being arranged to effect signal transmission at a reduced bit rate in the event of such local mains power interruption, the light conductor path is constructed to present separate optical transmission channels for the narrowband signals and for the broadband signals.

9 Claims, 5 Drawing Figures

SERVICE INTEGRATED DIGITAL TRANSMISSION SYSTEM

BACKGROUND OF THE INVENTION

The present invention relates to a service integrated, time multiplex digital system provided with devices for transmitting narrowband and broadband signals via a light conductor path.

U.S. Application Ser. No. 324,662, filed by Hans-Jurgen Schmack et at. on Nov. 24th, 1981, and claiming priority of German Application Ser. No. 30 44 605.0 of Nov. 27th, 1980, discloses a service integrated digital system operating in time multiplex and equipped with devices for the transmission of narrowband and braodband signals between a subscriber terminal and a central exchange terminal in which, at the transmitting end, the narrowband and broadband signals, respectively, are combined by multiplexers, and are transmitted over a lightwave conductor system and, at the receiving end, the narrowband signals and the broadband signals are recovered by demultiplxers. In this system, operating power for the subscriber terminal is not supplied from the central exchange, yet the system has a high availability and is designed as inexpensively as possible while operating in an energy saving manner.

SUMMARY OF THE INVENTION

It is an object of the present invention to improve the system disclosed in the above-cited application.

In an article entitled, "Der Einsatz von optischen Systemen in Breitbandverteilanlagen" [The Use of Optical Systems in Broadband Distribution Systems] by Manfred Welzenbach and Bernhard Weist in Wissenschaftliche Berichte [Scientific Reports], AEG-Telefunken 53 (1980) 1-2, at pages 62-71, FIG. 19 illustrates, and the associated text describes, a subscriber terminal equipped with two light conductors for braodband distribution and additional narrow-band and broadband services in wavelength multiplex, where broadband and narrowband signals are likewise each transmitted in a separate optical channel. However, this article does not discuss the problems of operating power supply.

The above and other objects are achieved, according to the invention, in a service integrated multiplex signal transmission system for transmitting narrowband and braodband signals between a central exchange terminal and a subscriber terminal, which system includes means defining a light conductor path connected between the terminals, a transmitter device at one terminal composed of sources of such narrowband and broadband signals and multiplexing means connected for combining the signals provided by the sources into a multiplex signal and for supplying such multiplex signal to the light conductor path, and a receiver device at the other terminal composed of demultiplexing means connected to the light conducting path for receiving multiplex signals from that path and separating the received multiplex signals into narrowband signals and broadband signals, the device at the subscriber terminal being normally supplied with operating power by local utility mains, and including a charge accumulator for supplying operating power independently of the local mains, connected for supplying such power to the device at the subscriber terminal in the event of interruption of the power supply provided by the local mains, and the system being arranged to effect signal transmission at a reduced bit rate in the event of such local mains power interruption, by constructing the means defining a light conductor path to present separate optical transmission channels for the narrowband signals and for the broadband signals.

The transmission system according to the present invention has the advantages that, due to the separation between narrowband and broadband paths, special switching means for switching to purely narrowband operation when there is an interruption in the mains operating power are not required and the availablility of the system is increased. According to the invention, the separation between broadband and narrowband signal transmissions is effected by a light conductor operating in space-, wavelength-, time-, i.e. burst mode, or direction-multiplex, or by a combination of the above methods.

It is of particular advantage to provide a laser diode as the transmitting transducer for the optical channel for broadband signal transmission and a light emitting diode as the transmitting transducer for the optical channel for narrowband signal transmission, the latter diode certainly being sufficient to meet the requirements of narrow-band operation but consuming much less power and being substantially more reliable than a laser diode.

The transmission system according to the invention is of course not limited to digital broadband transmission; rather the broadband transmission can take place, in an advantageous manner, also in analog form, for example with frequency multiplex residual sideband modulation, which eliminates the not insignificant costs for analog-digital converters and digital-analog coverters.

DESCRIPTION OF THE PREFERRED EMBODIMENTS

Figure 1:
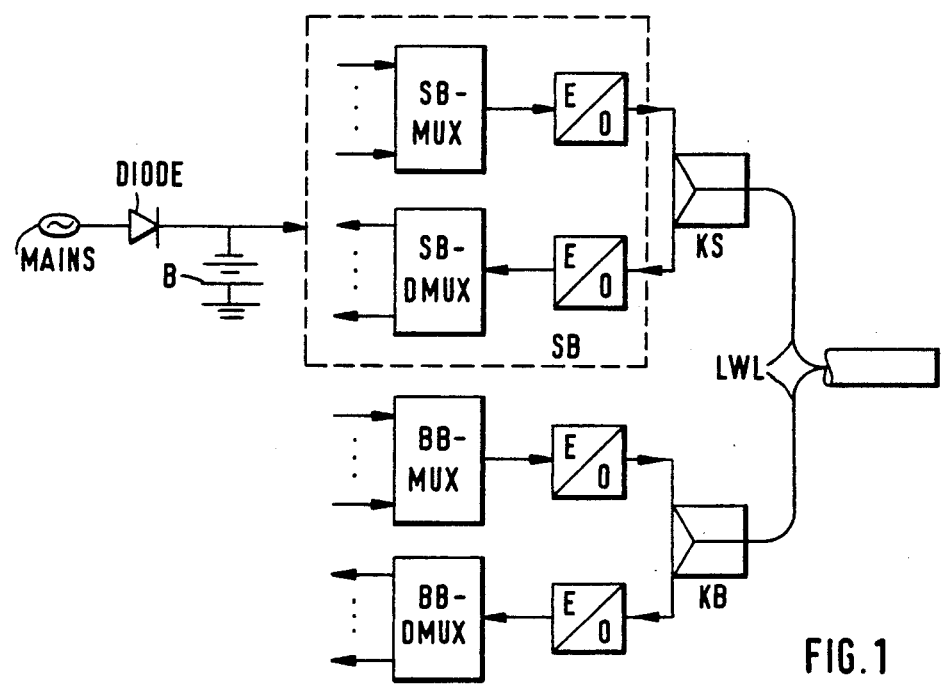
FIG. 1 is block circuit diagram of one terminal of a preferred embodiment of a system according to the invention.

FIG. 1 shows the subscriber terminal portion of a system for narrowband and broadband signal transmission at the subscriber's end in which the two types of signals are each transmitted via reapective multiplexers SB-MUX and BB-MUX to their respectively associated electro-optical transducers E/O. Each type of signal has its own light conductor of path LWL. For the return direction of transmission, the same light conductor is used for each type of signal, there being included each time a directional coupler KS or KB, respectively. The received light signal of each type is delivered to a respective receiving transducer E/O whose electrical output signal is separated by a respective demultiplexer SB-DMUX or BB-DMUX into the individual narrowband or broadband channels, respectively.

Due to the separate transmission of the narrowband services over their own optical channel, a separate operating power supply is made possible. If there is an interruption in the mains supply power, only the component groups SB, enclosed by broken lines in the upper left-hand portion of FIG. 1, are supplied with current from a buffer battery B so as to maintain the narrowband services. The separate transmission has the further advantage that narrowband multiplexers or demultiplexers, because of the lower transmission rates, can be designed significantly more power efficiently than the corresponding components for the high transmission rates of the broadband services.

As also shown in FIG. 1, battery B is preferably connected via a diode to be maintained charged by the power mains.

Figure 2:
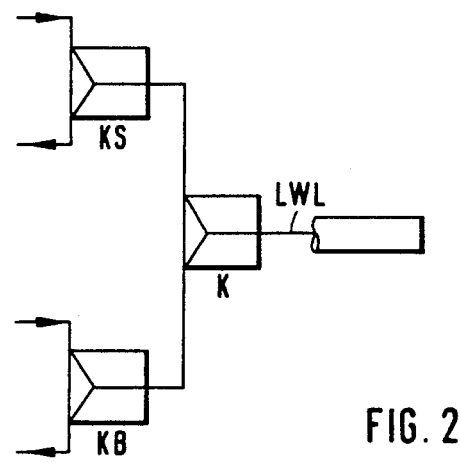
FIG. 2 is a similar diagram of a modified version of a portion of the arrangement of FIG. 1.

FIG. 2 shows a modified embodiment of the invention in which the optical devices at the subscriber's end are associated with only a single light conductor, and in which a further directional coupler K combines the narrowband and broadband multiplex signals, for transmission and separates them during reception.

The burst mode mentioned herein is described in an article by B. S. Bosik of Bell Laboratories, entitled "The Case in favor of Burst-Mode Transmission for Digital Subscriber Loops", published in the periodical *NTG (Nachrichtentechnische Gesellschaft)* - Fachbericht, Vol. 73, pp 26 et seq.

In the operation of the embodiment of FIG. 1, the broadband and narrowband signals are separated by spacemultiplexing in that each of these signals is transmitted over a separate light conductor, i.e. the two signals are maintained spatially separated.

In the operation of the embodiment of FIG. 2, the broadband and narrowband signals may be separated by time-multiplexing, particularly according to the burst-mode technique. Alternatively, the signals may be separated by wavelength-multiplexing in that each electro-optical transmitting transducer emits light of a respectively different wavelength and each opto-electrical receiving transducer is insensitive to the wavelength of the signal type not intended for its associated demultiplexer.

Directional coupler KS, KB or K, respectively, may be realised e.g. by means of a T-coupler (FIG. 3) or a grating muliplexer/demultiplexer (FIG. 4) or a similar interference filter.

Figure 3:
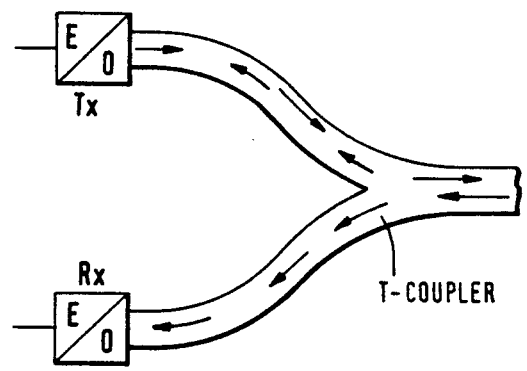
FIGS. 3 to 5 show a more detailed arrangement of optical couplers KS, KB and K.

In FIG. 3 the transmit and receive direction, both having the same wavelength, are separated by beamsplitting. In this case the received light signal preferably is splitted such that the major part is directed to the receiver RX(E/O). The minor part being directed to the transmitter TX (E/O) does not influence the optical transmit signal. This device can equally be used for directional couplers KS, KB and K.

Figure 4:
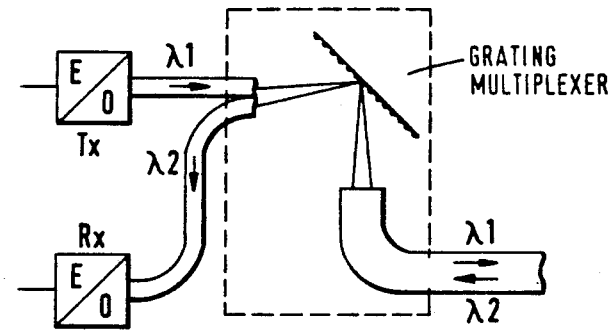

In FIG. 4 transmit and receive signals have different optical wavelengths and are multiplexed or demultiplexed, respectively, in a grating multiplexer or a similar device e.g. interference filter. This can be used for directional couplers KS and KB, considering different wavelengths in both applications.

In the case of directional coupler K a slight modification might be necessary (FIG. 5) in such that wavelengths λ1, λ2 of the narrowband signal are focused on one fiber and wavelengths λ3, λ4 of the broadband signal are focused on the other fiber.

Figure 5:
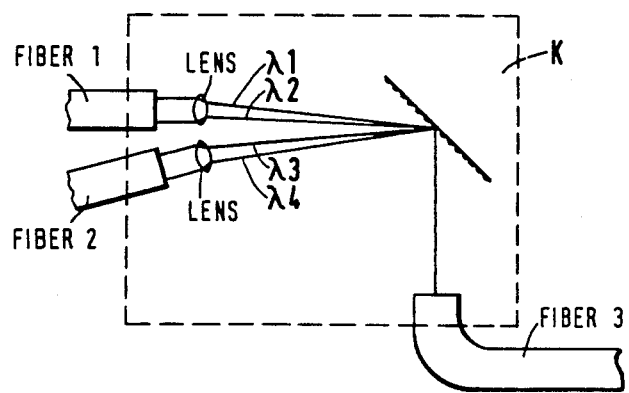

Couplers according to FIGS. 4, 5 are described in Electronic Letters, Vol. 16, No. 3, pp. 106–108.

A T-coupler according to FIG. 3 is described more detailed in Electronic Letters, Vol. 16, No. 17, pp. 673–674.

It will be understood that the above description of the present invention is susceptible to various modifications, changes and adaptations, and the same are intended to be comprehended within the meaning and range of equivalents of the appended claims.

What is claimed is:

1. In a service integrated digital multiplex signal transmission system for transmitting narrowband and broadband signals between a central exchange terminal and a subscriber terminal, which system includes means defining a light conductor path connected between the terminals, a transmitter device at one terminal composed of narrowband signal transmitting means including a source of narrowband light signals, broadband signal transmitting means including a source of broadband light signals, and optical means connected between the light conductor path and the sources of light signals for supplying such light signals to the light conductor path, and a receiver device at the other terminal composed of broadband light signal receiving means, narrowband light signal receiving means, and optical means connected to the light conducting path for receiving light signals from that path and separately conducting the received narrowband and broadband light signals to respective ones of the receiving means, the device at the subscriber terminal being normally supplied with operating power by local utility mains, and including a charge accumulator for supplying operating power independently of the local mains, connected to the narrowband means at the subscriber terminal for supplying such power only to the narrowband means at the subscriber terminal in the event of interruption of the power supply provided by the local mains, and the system thus being arranged to effect transmission of the light signals over the light conductor path in the event of such local mains power interruption, at a reduced bit rate compared to the bit rate utilized when power is being supplied by the local mains, the improvement wherein said optical means in said transmitter and receiver devices are constructed and connected to said light conductor path such that said optical means and said light conductor path constitute means establishing separate optical transmission channels for the narrowband signals and for the broadband signals between said sources at said one terminal and said receiving means at said other terminal, said optical means at said subscriber terminal comprise a broadband signal directional coupler connected to said broadband means at said subscriber terminal for permitting broadband light signal transmission to be effected by directional multiplexing and a narrowband signal directional coupler connected to said narrowband means at said subscriber terminal for permitting narrowband light signal transmission to be effected by directional multiplexing, said source of broadband light signals comprises a laser diode coupling the broadband light signals to said path, and said source of narrowband light signals comprises a light emitting diode coupling the narrowband light signals to said path.

2. Transmission system as defined in claim 1 wherein said conductor path comprises at least one light conductor.

3. Transmission system as defined in claim 2 wherein said means defining a conductor path present separate transmission channels by wavelength multiplexing of the narrowband and broadband signals.

4. Transmission system as defined in claim 2 or 3 wherein said transmitter device comprises means for transmitting signals via said conductor path according to the burst mode.

5. Transmission system as defined in claim 2 or 3 wherein said means defining a light conductor path comprise directional light couplers connected for permitting transmission to be effected by directional multiplexing.

6. Transmission system as defined in claim 1, 2 or 3 wherein said transmitter comprises a laser diode coupling the broadband signals to said path and a light emitting diode coupling the narrowband signals to said path.

7. In a service integrated digital multiplex signal transmission system for transmitting narrowband and broadband signals between a central exchange terminal and a subscriber terminal, which system includes means defining a light conductor path connected between the terminals, a transmitter device at one terminal, said transmitter device being composed of: broadband signal processing means including multiplexing means constituting a source of a digital multiplexed broadband signal and first broadband transducer means connected to said multiplexing means for converting the broadband signal into a corresponding broadband light signal; narrowband signal processing means including a source of a digital narrowband signal and first narrowband transducer means connected for converting the narrowband signal into a corresponding narrowband light signal; and first optical means connected to said transducer means for supplying the broadband and narrowband light signals to the light conductor path, and a receiver device at the other terminal, said receiver device being composed of: second optical means connected to the light conductor path for receiving light signals from that path and separating the received broadband light signals from the received narrowband light signals; broadband signal processing means including second broadband transducer means connected to said second optical means for converting the received broadband light signal into a corresponding broadband electrical signal and demultiplexing means connected to said second broadband transducer means for demultiplexing the broadband electrical signal; and narrowband signal processing means including second narrowband transducer means connected to said second optical means for converting the received narrowband light signal into a corresponding narrowband electrical signal, with said device at said subscriber terminal being normally supplied with operating power by local utility mains, said system further including a charge accumulator at said subscriber terminal for supplying operating power independently of the local mains and connected to the narrowband signal processing means for supplying such power only to said narrowband signal processing means at said subscriber terminal in the event of interruption of the power supply provided by the local mains, the improvement wherein said first and second optical means are constructed and connected to their associated transducer means and to said light conductor path such that said optical means and said light conductor path constitute means establishing separate optical transmission channels for transmission of the broadband and narrowband light signals over said light conductor path between said transducer means of said transmitter device and said tranducer means of said receiver device, said optical means at said subscriber terminal comprise a broadband signal directional coupler connected to said broadband means at said subscriber terminal for permitting broadband light signal transmission to be effected by directional multiplexing and a narrowband signal directional coupler connected to said narrowband means at said subscriber terminal for permitting narrowband light signal transmission to be effected by directional multiplexing, said first broadband transducer means comprise a laser diode coupling the broadband light signal to said path, and said first narrowband transducer means comprise a light emitting diode coupling the narrowband light signal to said path.

8. Transmission system as defined in claim 7 wherein said first broadband transducer means comprises a laser diode and said first narrowband tranducer means comprises a light emitting diode.

9. In a service integrated digital multiplex signal transmission system for transmitting narrowband and broadband signals between a central exchange terminal and a subscriber terminal, which system includes means defining a light conductor path connected between terminals, and the subscriber terminal being provided with a transmitter device composed of narrowband signal transmitting means including a source of narrowband light signals, broadband signal transmitting means including a source of broadband light signals, and first optical means connected between the light conductor path and the sources of light signals for supplying such light signals to the light conductor path, and a receiver device composed of broadband light signal receiving means, narrowband light signal receiving means, and second optical means connected to the light conducting path for receiving light signals from that path and separately conducting the received narrowband and broadband light signals to respective ones of the receiving means, the device at the subscriber terminal being normally supplied with operating power by local utility mains, and including a charge accumulator for supplying operating power independently of the local mains, connected to the narrowband means at the subscriber terminal for supplying such power only to the narrowband means at the subscriber terminal in the event of interruption of the power supply provided by the local mains, and the system thus being arranged to effect transmission of the light signals over the light conductor path in the event of such local mains power interruption, at a reduced bit rate compared to the bit rate utilized when power is being supplied by the local mains, the improvement wherein said first and second optical means in said transmitter and receiver devices are constructed and connected to said light conductor path such that said optical means and said light conductor path constitute means establishing separate optical transmission channels for the narrowband signals and for the broadband signals tranmitted from and received at said subscriber terminal, said first and second optical means together comprise a first directional coupler coupling said source of narrowband light signals and said narrowband light signal receiving means to said light conductor path for permitting narrowband light signal transmission and reception to be effected by directional multiplexing and a second directional coupler coupling said source of broadband light signals and said broadband signal receiving means to said light conductor path for permitting broadband light signal transmission and reception to be effected by directional multiplexing, said source of broadband light signals comprises a laser diode coupling the broadband light signals to said path, and said source of narrowband light signals comprises a light emitting diode coupling the narrowband light signals to said path.

* * * * *